US011185064B2

(12) United States Patent
McLean

(10) Patent No.: US 11,185,064 B2
(45) Date of Patent: Nov. 30, 2021

(54) HORSESHOE PLUG AND HORSESHOE PLUG INSERTION ASSEMBLY

(71) Applicant: Phillip McLean, Donaghcloney (GB)

(72) Inventor: Phillip McLean, Donaghcloney (GB)

(*) Notice: Subject to any disclaimer, the term of this patent is extended or adjusted under 35 U.S.C. 154(b) by 40 days.

(21) Appl. No.: 15/547,700

(22) PCT Filed: Feb. 1, 2016

(86) PCT No.: PCT/EP2016/052098
§ 371 (c)(1),
(2) Date: Jul. 31, 2017

(87) PCT Pub. No.: WO2016/120496
PCT Pub. Date: Aug. 4, 2016

(65) Prior Publication Data
US 2018/0007887 A1    Jan. 11, 2018

(30) Foreign Application Priority Data

Jan. 30, 2015 (GB) ........................ 1501609
Mar. 27, 2015 (GB) ........................ 1505349

(51) Int. Cl.
A01L 11/00 (2006.01)
A01L 7/06 (2006.01)
A01L 7/00 (2006.01)
A01L 7/04 (2006.01)

(52) U.S. Cl.
CPC ............... A01L 11/00 (2013.01); A01L 7/00 (2013.01); A01L 7/04 (2013.01); A01L 7/06 (2013.01)

(58) Field of Classification Search
CPC ......... B23P 11/00; B23P 11/005; B23P 19/04; B23P 19/10; B25B 3/00; A01L 11/00; A01L 7/00; A01L 7/04; A01L 7/06

USPC .......... 227/27; 29/243.5, 278, 255, 244, 275
See application file for complete search history.

(56) References Cited

U.S. PATENT DOCUMENTS 3,526,257 A * 9/1970 Kirkland ............... B25B 23/06
 206/338
3,774,607 A * 11/1973 Schmitz ............ A61M 37/0069
 604/61
3,907,014 A * 9/1975 Manino ................. B25B 23/06
 81/433

(Continued)

FOREIGN PATENT DOCUMENTS

DE        10125940          12/2002
DE     202007001379     *   5/2007      ............... A01L 7/04

OTHER PUBLICATIONS

Translation of DE202007001379, Retrieved from Espacenet Sep. 23, 2019 (Year: 2007).*

(Continued)

Primary Examiner — Lee D Wilson
Assistant Examiner — Thomas Raymond Rodgers
(74) Attorney, Agent, or Firm — Preston Smirman; Smirman IP Law, PLLC

(57) ABSTRACT

A plug blank insertion assembly for inserting a plug blank into a stud orifice of a horseshoe, said plug insertion assembly having an arrangement for guiding movement of the plug blank; an arrangement for moving the plug blank via the guiding means towards and out of a plug blank dispensing end of the plug insertion assembly so the plug blank is dispensed from the plug insertion assembly into the stud orifice of a horseshoe.

26 Claims, 8 Drawing Sheets

(56) References Cited

U.S. PATENT DOCUMENTS

| | | | | |
|---|---|---|---|---|
| 4,467,488 | A | 8/1984 | Creek | |
| 4,673,387 | A * | 6/1987 | Phillips | A61M 37/0069 604/62 |
| 5,611,811 | A * | 3/1997 | Goldberg | A61B 17/3468 606/187 |
| 6,428,463 | B1 * | 8/2002 | Ravins | A61M 37/0069 600/7 |
| 2009/0044959 | A1 * | 2/2009 | Mastice | A01L 7/04 168/11 |
| 2009/0084560 | A1 * | 4/2009 | Spooner | A01L 7/04 168/31 |
| 2012/0017728 | A1 * | 1/2012 | Schmidt | B25B 11/007 81/57.37 |
| 2013/0226188 | A1 * | 8/2013 | Campion | A61B 17/8822 606/94 |
| 2014/0257232 | A1 * | 9/2014 | Mathur | A61B 17/8825 604/500 |

OTHER PUBLICATIONS

International Search Report for PCT/MY2015/050125 dated May 31, 2016.
Written Opinion of the International Searching Authority for PCT/MY2015/050125 dated May 31, 2016.
International Preliminary Report on Patentability for PCT/MY2015/050125 dated Aug. 1, 2017.
English Abstract of DE10125940.
English Abstract of DE202007001379.

* cited by examiner

HORSESHOE PLUG AND HORSESHOE PLUG INSERTION ASSEMBLY

CROSS-REFERENCE TO RELATED APPLICATION

The instant application is a national phase of PCT International Application No. PCT/EP2016/052098 filed Feb. 1, 2016, and claims priority to GB Patent Application Serial No. 1505349.9 filed Mar. 27, 2015, and GB Patent Application Serial No. 1501609.0 filed Jan. 30, 2015, the entire specifications of all of which are expressly incorporated herein by reference.

The present invention relates to a horseshoe plug and to an assembly for the insertion of horseshoe plugs into stud orifices of a horseshoe.

Horses are used in a wide range of functions with police horses being used for controlling crowds at events like concerts or football matches. Other people use horses for pulling carriages for weddings, shows, processions or other formal functions. In addition to horses being used in business ventures, many people like to take their own horses out hacking for fun and competition with numerous disciplines which include eventing, show jumping, dressage, polo, show classes and/or driving classes. All of these occasions require the horses to be shod. Furthermore, in order to allow the horses to perform near their optimum level they should be trained which requires them to be operating at reasonable speeds over extended periods of time regularly. This is where the advantages of the traditional horse shoes come in because the horses can be trained for greater lengths of time at higher speeds on all sorts of surfaces. The ski effect provided by the steel horse shoes reduce the shock on the horses limbs each time the horse sets its hooves back onto the ground.

However, it is often desirable for the horse shoe to be provided with studs. It is common practice for horseshoes to be manufactured with orifices for the installation of studs. The stud comprises a threaded anchor and an expanded head and is typically attachable to the horseshoe via the use of an internal screw thread on the interior wall of the stud orifice which cooperates with the outer screw thread on the threaded anchor of the stud itself. The purpose of the stud is to improve a horse's balance and grip over uneven surface or terrain. When the studs are removed from the horseshoe of this type, the vacant orifice is exposed to the accumulation of dirt and debris and as the interior of the orifice is threaded the likelihood of retention of undesirable material is increased. However, even the recent development of non-threaded studs requires that the orifice is kept clear of dirt and debris. Before a stud can be installed the user typically has to clean out the orifice using an implement such as a brush and/or sharp spike to ensure the thread is fully cleared of debris. This is a time-consuming exercise which has to be repeated numerous times corresponding to the number of stud orifices present in each horseshoe. This job is particularly cumbersome where small stones or other hard yet breakable material become compressed into the orifice.

To prevent the accumulation of dirt and debris in the vacant orifices it is known to fill the orifice of the horseshoe with a plug whilst the studs are not in use. These plugs can be made from a variety of materials including cotton, rubber and metal. Cotton plugs are relatively cheap and are easily insertable by hand into the stud orifice. However over time these plugs deteriorate which allows dirt and debris into the orifice which also becomes difficult to remove effectively, requiring the use of an implement such as those described previously in order to fully remove them. Rubber plugs are also easily insertable however the main problem with these is that they are generally frusto-conical shaped. When installed they do not form a flush finish with the shoe and the result of this is that the rubber plugs can easily get caught during contact with the ground and pulled free of the orifice. Metal plugs generally have a screw thread so that they can be fitted securely into the stud orifice thus preventing any accidental removal, however they are generally installed using hex keys which can be time consuming and difficult task depending on the number of stud orifices present. Furthermore, the actual orifice on the studs for receiving the hex key can become contaminated with dirt and debris making it impossible to screw the studs. Also, these studs have to be screwed in and out and this is not easily achieved with one hand, the other hand holding the horses hoof. There is also the problem in that the stud orifice is limited to the screw thread so any damage on the screw thread of the plug means that plug must be replaced. Furthermore if plugs are lost a new set must be purchased. Thus there exists a requirement for a horseshoe plug which forms a flush finish and can be inserted/removed efficiently.

It is an object of the present invention to obviate or mitigate the problem of protecting vacant stud orifices in horseshoes via the use of a device which allows for the convenient installation of a plug which is easy to remove and forms a flush finish when installed.

Accordingly, the present invention provides a plug blank insertion assembly for inserting a plug blank into a stud orifice of a horseshoe, said plug blank insertion assembly comprising:

means for guiding movement of the plug blank;
means for moving the plug blank via the guiding means towards and out of a plug blank dispensing end of the plug insertion assembly so the plug blank is dispensable from the plug insertion assembly into the stud orifice of a horseshoe.

Ideally, the means for moving the plug blank along the guiding means comprises means for positively engaging at least part of the plug blank.

Preferably, the means for moving the plug blank along the guiding means comprises means for pushing the plug blank along the guiding means.

Preferably, the means for moving the plug blank along the guiding means comprises means for pushing a trailing end of the plug blank along the guiding means. By trailing end of the plug blank we mean the end of the plug blank which is insertable into the stud orifice last.

Ideally, the means for moving the plug blank is capable of extending into and through the means for guiding movement of the plug blank.

Ideally, the means for moving the plug blank is capable of extending into and through the means for guiding movement of the plug blank for dispensing the plug blank completely out of the means for guiding movement of the plug blank so that the plug blank is completely detachable from the guiding means via the movement of the plug blank moving means.

Preferably, the means for positively engaging at least part of the plug blank is movable relative to the guiding means.

Ideally, the plug insertion assembly has actuation means.
Preferably, the means for moving the plug blank along the guiding means comprises actuation means.

Ideally, the actuation means is operably coupled to the plug blank engaging means.

Preferably, the actuation means comprises a trigger.

Ideally, the actuation means is movably and preferably pivotally coupled to or proximal to the means for guiding the plug blank.

Preferably, the means for guiding movement of the plug blank comprises a holder for holding a plurality of plug blanks.

Ideally, the holder for holding a plurality of plug blanks comprises means for holding a plurality of separate plug blanks spaced apart from one another.

Preferably, the holder for holding a plurality of plug blanks is movably mounted relative to the means for moving the plug blank so that each means for holding a plug blank is independently alignable with the means for moving the plug blank.

Ideally, the holder for holding a plurality of plug blanks comprises a cylinder having a plurality of through bores each having a longitudinal axis parallel to the longitudinal axis of the cylinder.

Preferably, the holder for holding a plurality of blanks comprises a cylinder having a plurality of through bores spaced angularly around the circumference of the cylinder.

Ideally, the holder for holding a plurality of blanks comprises a cylinder having a plurality of through bores equi-spaced angularly around the circumference of the cylinder.

Preferably, the holder for holding a plurality of blanks comprises a cylinder having a gripping means on the outer curved surface of the cylinder. Advantageously, this allows an operator to easily rotate the cylinder so as to align the through bores with the means for moving the plug blanks.

Preferably, the holder for holding a plurality of blanks comprises a cylinder having at least one indentation on the outer curved surface of the cylinder.

Ideally, the holder for holding a plurality of blanks comprises a cylinder having a plurality of indentations spaced/equi-spaced around the outer curved surface of the cylinder.

Ideally, the cylinder for holding a plurality of plug blanks is movably mounted relative to the means for moving the plug blank so that each through bore of the cylinder for holding a plug blank is independently alignable with the means for moving the plug blank.

Preferably, the means for moving the plug blank comprises a hammer having a leading end for positively engaging a plug blank and a trailing end distal the leading end.

Ideally, the hammer has a plug blank dispensing position and an out of use position and a biasing means for normally biasing the hammer into an out of use position.

Preferably, the hammer has a means for engaging the actuation means.

Ideally, the plug insertion assembly comprises a housing for locating and supporting the means for guiding movement of the plug blank and for locating and supporting the means for moving the plug blank.

Preferably, the housing comprises a handle.

Ideally, the housing has bearing means for journaling the two ends of the hammer and for allowing the hammer to slide along the housing towards and away from the means for guiding movement of the plug blank.

Preferably, the housing comprises means for movably and preferably pivotally coupling the actuation means to the housing.

Ideally, the housing has a plug blank insertion end for locating and supporting the means for guiding movement of the plug blank.

Preferably, the means for guiding movement of the plug blank is rotatably mounted on the plug blank insertion end of the housing.

Preferably, the plug blank insertion assembly has indicia means for indicating which plug blank is currently being inserted into the horse shoe stud orifice.

Ideally, the indicia means comprises visual indicia means.

Preferably, the indicia means comprise a visual marker.

Ideally, the indicia means comprise a visual alignment line to act as a line of sight for the operator to properly align the dispensing end of the plug blank insertion assembly with the stud orifice of the horse shoe.

Ideally, the visual maker is located on the plug blank dispensing end of the plug blank insertion assembly.

Ideally, the plug blank protrudes a predetermined distance from the plug insertion assembly.

Advantageously, the means for moving the plug blank urges the plug blank along the guide means so as to protrude a distance equating to the desired length of a plug. In this way the exact amount of blank material protrudes from the plug insertion assembly allowing the plug blank to be cut in position or pre-cut during manufacturing.

Ideally, the length of the plug is variable. The length of the plug is dependent on the depth of the orifice in the horse shoe. The depth of the horse shoe may be manufactured to different depths. Parts of the horse shoe may also wear down as a result of high use and so even orifices on the same horse shoe may have different depths. The horse shoe may also wear in an uneven fashion subject to the gait of the horse wearing the shoes.

Ideally, the plug blank is pre-cut to length. The pre-cut plugs are held together with a peripheral web. In this embodiment, the plug blank is urged forward into an empty orifice and a user can simply moves the gun to the side to tear the small remaining connecting web between precut plugs.

Ideally, the plug insertion assembly comprises means for cutting the protruding plug blank into a plug. The plugs can be cut to any length subject to the depth of the orifice.

Preferably, the means for moving the plug blank along the guiding means comprises means for positively engaging at least part of the plug blank. By positively engaging at least part of the plug blank we mean that the engaging force is sufficient to force the free end of the plug blank into the empty stud orifice in the horse shoe without any slippage between the engaging means and the plug blank against at least some forces caused by minor misalignment of the plug blank and orifice or interference between the internal screw thread and the leading edge and/or outer surface of the plug.

Ideally, the means for engaging at least part of the plug blank is movable relative to the guiding means.

Ideally, the plug insertion assembly has actuation means.

Preferably, the means for moving the plug blank along the guiding means comprises actuation means.

Ideally, the actuation means is operably coupled to the plug blank engaging means.

Preferably, the actuation means comprises trigger means.

Ideally, the actuation means is movably and preferably pivotally coupled to or proximal to the means for guiding the plug blank.

In one embodiment, the means for engaging the plug blank is part of the actuation means.

In this embodiment, the means for engaging the plug blank comprises a spike, or teeth or clamp means or urging means acting against the plug blank.

Ideally, the engagement means has an adjustable clamping arrangement for gripping and releasing the plug blank.

Preferably, the adjustable clamping arrangement has adjustment means for adjusting an aperture of the adjustable clamping arrangement.

Ideally, the actuation means is operably coupled to the adjustment means.

Ideally, the adjustable clamping arrangement comprises a collar or a body having a through bore for receiving the plug blank.

In this embodiment, the size of the aperture of the collar or through bore is adjustable. Advantageously, this allows the plug blank to be gripped and released depending on the direction of motion of the actuation means.

Ideally, when the actuation means is driving the plug blank towards the dispensing end of the plug insertion assembly, the collar or body with through bore is gripping the plug blank.

Preferably, when the actuation means is moving the adjustable clamping arrangement away from the dispensing end of the plug insertion assembly, the collar or body with through bore releases the plug blank.

Ideally, the plug blank is movable through the collar or body with through bore when the actuation means is released.

Preferably, the plug insertion assembly has abutment means for abutting the plug blank when the actuation means is released. Advantageously, this prevent the plug blank from sliding backwards away from the dispensing end when the actuation means is released.

Preferably, the guiding means for the plug blank comprises a channel for receiving the plug blank.

Ideally, the channel is an elongate channel extending along a longitudinal axis of the plug insertion assembly.

Ideally, the means for guiding the plug blank comprises movement control means for preventing other than longitudinal movement of the plug blank along the means for guiding the plug blank.

Ideally, the movement control means in combination with the channel directs the plug blank towards and into the stud orifice of the horse shoe.

Preferably, the plug blank movement control means is disposed along at least part of the length of the channel.

Ideally, the plug blank movement control means comprise at least one collar for guiding the movement of the plug blank.

In one embodiment, the guide means comprises a tubular body.

In this embodiment, the plug blank movement control means comprises a tubular body.

Ideally, the actuation means is operably coupled to the cutting means.

Preferably, the actuation means is adapted to operate the cutting means only when the plug blank has been projected from the dispensing end of the plug insertion assembly.

Preferably, the same actuation means operates both the means for moving the plug blank and the cutting means.

In an alternate arrangement, separate actuation means are used for the means for moving the plug blank and the cutting means.

Ideally, the cutting means is mounted on a plug blank dispensing end of the plug insertion assembly.

Preferably, the cutting plane of the cutting means is orthogonal to the longitudinal axis of the plug blank.

Preferably, the plug insertion assembly is a handheld device.

Ideally, the plug insertion assembly has a main body comprising a handle, an actuation means and a plug blank supporting and guiding means.

Ideally, the main body of the plug insertion assembly is manufactured from but not limited to metal and/or plastic and/or composite materials or any combination thereof.

Ideally, the plug blank comprises an elongate rod most preferably a cylindrical rod.

Ideally, the plug blank being of various lengths.

Preferably, the plug blank material being malleable.

Ideally, the plug blank material being compressible.

Preferably, upon insertion of the compressible plug into the empty stud orifice, the plug material being expandable into the gaps between the internal thread for securely fastening the plug in position.

Preferably, the plug material comprising but not limited to rubber and/or plastic and/or polymer and/or any combination thereof.

Ideally, the plug material comprising but not limited to PVC or Polyethylene or Polypropylene or any combination thereof.

Preferably, the plug material comprising Thermo Plastic Elastomer (TPE).

Ideally, the handle and trigger comprising an actuation means.

In an alternative arrangement, the actuation means comprising a powered actuation means.

Ideally, the actuation means comprising an electrical motor.

In a preferred embodiment, the actuation means comprising a handle and a trigger/lever being movably and preferably pivotally coupled to the handle between an out of use position and an in use position.

Ideally, the trigger/lever being normally biased into an out of use position.

Ideally, the cutting means being operably coupled to the actuation means.

Preferably, the cutting means comprising a lever operated guillotine.

Ideally, the lever operated guillotine being operably coupled to the actuation means.

Preferably, the cutting means comprising but not limited to a blade and/or wire or any combination thereof.

Preferably, the cutting means being slidably mounted in a pair of mutually opposing channel portions on a dispensing end of the device.

Ideally, the cutting means comprising a square blade.

Preferably, the plug having substantially the same shape and size as the vacant stud orifice.

Ideally, the plug having an inference fit with the stud orifice.

Advantageously, the inference fit created by the plug prevents the accumulation of dirt and debris in the orifice.

Ideally, the plug blank comprises a cylindrical rod with a saw tooth configuration outer surface.

Preferably, plug blank comprises a cylindrical rod with a radially corrugated outer surface.

Preferably, the plug blank comprises a cylindrical rod with a plurality of uniform teeth protruding radially around the cylindrical rod.

Ideally, each tooth having a leading conical surface tapering from a central large diameter rim to a small diameter leading edge and a trailing conical surface tapering from the central large diameter rim to a small diameter trailing edge.

Ideally, the tapered leading conical surface improves the insertion of the plug into the empty stud orifice and across the internal thread.

Preferably, the tapered trailing conical surface improves the retention of the plug in the stud orifice by interfering with the inner thread.

Accordingly, the present invention provides a plug blank for use with a plug insertion assembly, the plug blank being insertable into a stud orifice of a horseshoe.

Ideally, the length of the plug blank is dependent on the depth of the stud orifice.

Preferably, the plug blank is a compressible plug blank.

Ideally, the plug blank having an interference fit with the stud orifice.

Advantageously, the inference fit created by the plug blank prevents the accumulation of dirt and debris in the orifice.

Preferably, the plug blank is substantially the same shape and size as the vacant stud orifice.

In one embodiment, where the plugs are pre-cut plugs, they are held together with a peripheral web or other portion of connecting material.

Ideally, the plug blank comprises an elongate rod most preferably a cylindrical rod.

Ideally, the plug blank being of various lengths.

Preferably, the plug blank material being malleable.

Ideally, the plug blank material being compressible.

Preferably, upon insertion of the compressible plug into the empty stud orifice, the plug material being expandable into the gaps between the internal thread for securely fastening the plug in position.

Preferably, the plug material comprising but not limited to rubber and/or plastic and/or polymer and/or any combination thereof.

Ideally, the plug material comprising but not limited to PVC or Polyethylene or Polypropylene or any combination thereof.

Preferably, the plug material comprising a thermo plastic elastomer (TPE).

Preferably, the plug material comprising a thermo plastic vulcanizate (TPV).

Ideally, the plug blank comprises a cylindrical rod with a saw tooth configuration outer surface.

Preferably, plug blank comprises a cylindrical rod with a radially corrugated outer surface.

Preferably, the plug blank comprises a cylindrical rod with a plurality of uniform teeth protruding radially around the cylindrical rod.

Ideally, each tooth having a leading conical surface tapering from a central large diameter rim to a small diameter leading edge and a trailing conical surface tapering from the central large diameter rim to a small diameter trailing edge.

Preferably, the leading conical surface tapers at an angle in a range of 40° to 75° to a plane perpendicular to the longitudinal axis of the plug blank.

Ideally, the leading conical surface tapers at an angle in a range of 55° to 65° and most preferably at an angle of 58° to a plane perpendicular to the longitudinal axis of the plug blank.

Preferably, the trailing conical surface tapers at an angle in a range of 20° to 50° to a plane perpendicular to the longitudinal axis of the plug blank.

Ideally, the trailing conical surface tapers at an angle in a range of 30° to 40° and most preferably at an angle of 34° to a plane perpendicular to the longitudinal axis of the plug blank.

Ideally, the tapered leading conical surface improves the insertion of the plug into the empty stud orifice and across the internal thread.

Preferably, the tapered trailing conical surface improves the retention of the plug in the stud orifice by interfering with the inner thread.

Ideally, the plug blank being at least partially pre-cut and/or cut in place by the plug insertion assembly into plugs.

Preferably, the plug blank has indicia means for indicating which end of the plug blank is to be inserted into the guiding means first and/or into the horse shoe stud orifice first.

Ideally, the indicia means comprises visual or tactile indicia means.

Preferably, the indicia means comprise a visual marker.

Ideally, the visual maker is located on one end of the plug blank.

Ideally, the plug blank is visually optimized for improving the visibility of the plug blank. Advantageously, this allows the plug blank to be seen in low light conditions and/or makes the presence or absence of the plug blank more easily identifiable under the normal working conditions of a horse.

Preferably, the plug blank is manufactured from a white or cream material. Alternatively, the plug blank is manufactured from a material with a white or cream pigment added.

Ideally, the plug blank has a length in the range of 9 mm to 11 mm and most preferably has a length of 10 mm.

Preferably, the plug blank has an outside diameter in a range of 8 mm to 9 mm, preferably in a range of 8.5 mm to 8.7 mm and most preferably an outside diameter of 8.64 mm.

Ideally, the plug blank material has a shore hardness value in the range of 60 to 80 and most preferably has a shore hardness of 69.

The skilled man will appreciate that all preferred or optional features of the invention described with reference to only some aspects or embodiments of the invention may be applied to all aspects of the invention.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The invention will now be described with reference to the accompanying drawings, which shows by way of example only four embodiments of an assembly for inserting plug blanks in a horse shoe in accordance with the invention. In the drawings.

Figure 1:
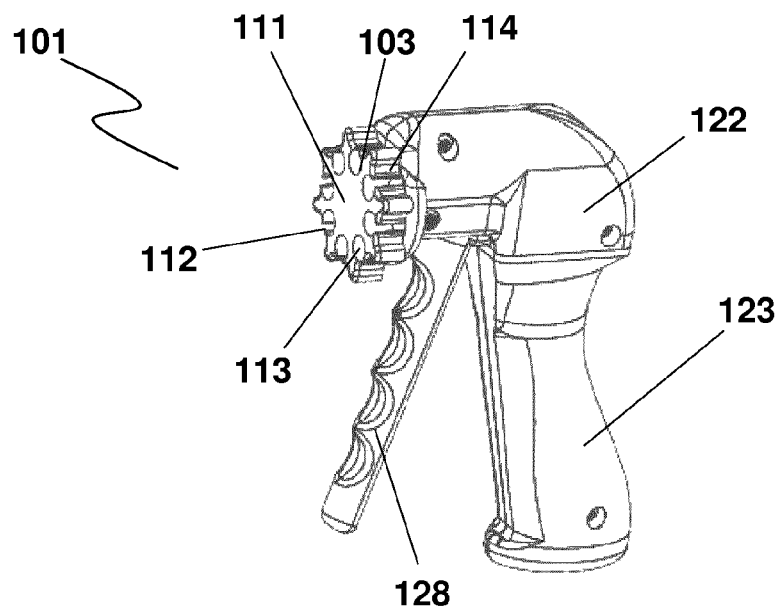
FIG. 1 is a perspective view of a first embodiment of plug insertion assembly.
Figure 2:
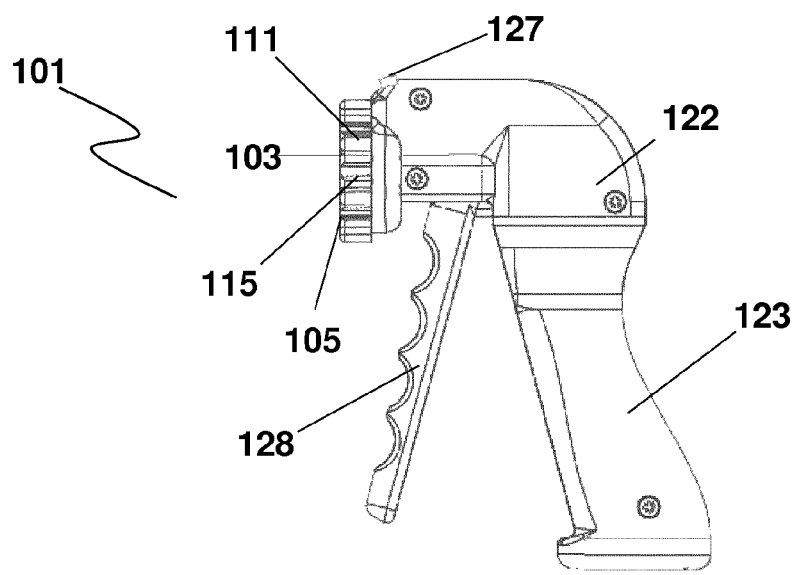
FIG. 2 is a side view of FIG. 1.
Figure 3:
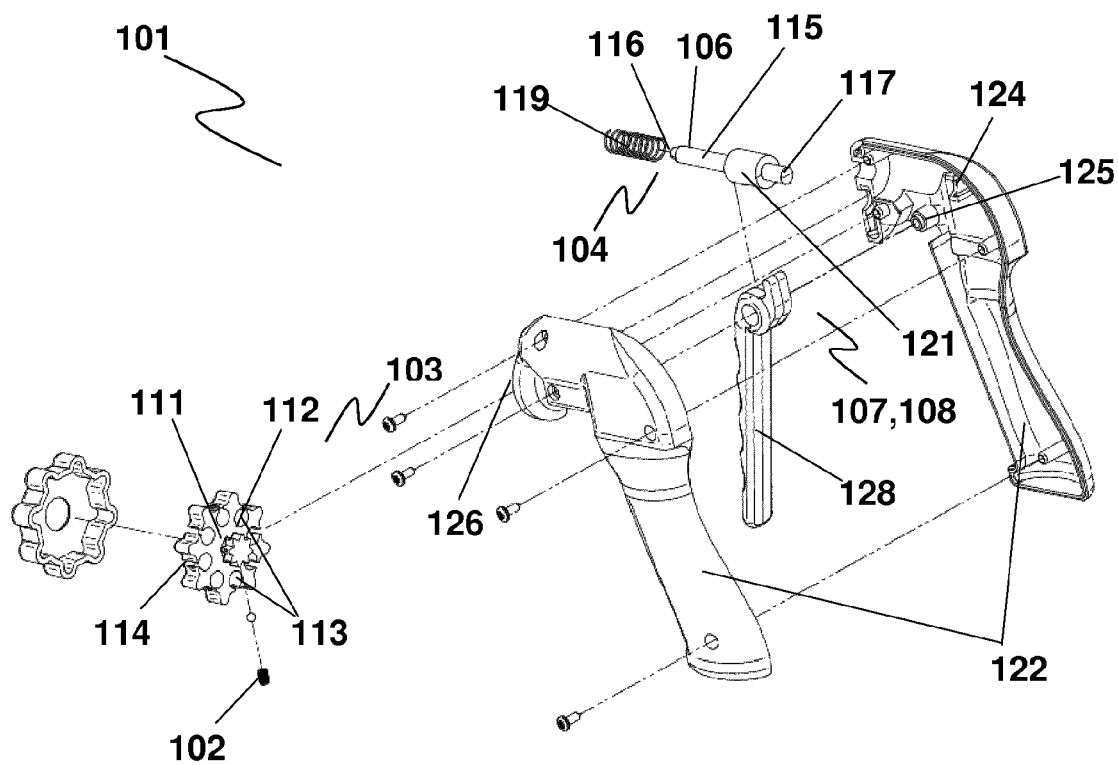
FIG. 3 is an exploded view of the first embodiment of plug insertion assembly.
Figure 4A:
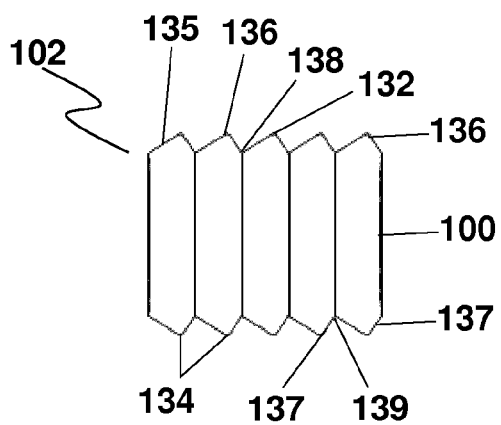
FIG. 4a is a side elevation view of a plug blank.
Figure 4B:
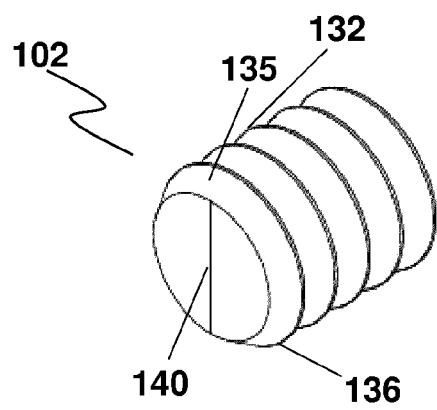
FIG. 4b is a perspective view of a plug blank.

Referring to the drawings and initially to FIGS. 1 to 4, there is shown a plug blank insertion assembly indicated generally by the reference numeral 101 for inserting a plug blank 102, see FIGS. 4a and 4b, into a stud orifice of a horseshoe. The plug insertion assembly 101 has an arrangement 103 for guiding movement of the plug blank 102 and an arrangement 104, see FIG. 3 for moving the plug blank 102 via the guiding arrangement 103 towards and out of a plug blank dispensing end 105, see FIG. 2 of the plug insertion assembly 101 so the plug blank 102 is dispensed from the plug insertion assembly 101 into the stud orifice of a horseshoe.

The arrangement 104 for moving the plug blank 102 along the guiding arrangement 103 has a mechanism 106 for positively engaging the trailing end 100, see FIG. 4a of the plug blank 102. The arrangement 104 for moving the plug blank 102 along the guiding arrangement 103 has mechanism 106 for pushing the plug blank 102 along the guiding arrangement 103. The arrangement 104 for moving the plug blank 102 along the guiding arrangement 103 has a mechanism 106 for acting on the trailing end 100 of the plug blank 102 by pushing only for moving the plug blank 102 along the guiding arrangement 103. By trailing end 100 of the plug blank 102 we mean the end of the plug blank 102 which is inserted into the stud orifice last or into the guiding arrangement 103 first. The arrangement 104 for moving the plug blank 102 is capable of extending into and through the arrangement 103 for guiding movement of the plug blank 102. The arrangement 104 for moving the plug blank 102 is capable of extending into and through the arrangement 103 for guiding movement of the plug blank 103 for dispensing the plug blank 102 completely out of the arrangement 103 for guiding movement of the plug blank 102. The plug blank 102 is completely detachable from the guiding arrangement 103 as a result of the movement of the plug blank moving arrangement 104 only. No other manipulation of the plug blank insertion assembly 101 other than the movement of the plug blank moving arrangement 104 is required to completely dispense the plug blank 102 from the guiding arrangement 103 and into the stud orifice of the horse shoe.

The arrangement 104 for positively engaging the plug blank 102 is movable relative to the guiding arrangement 103. The plug insertion assembly 101 has an actuation arrangement 107. The arrangement for moving the plug blank 102 along the guiding arrangement 103 has the actuation arrangement 107. The actuation arrangement 107 is operably coupled to the plug blank engaging arrangement 104. The actuation arrangement 107 has a trigger 108. The actuation arrangement 107 is pivotally coupled proximal to the arrangement 103 for guiding the plug blank 102. The arrangement 103 for guiding movement of the plug blank 102 has a holder 111 for holding eight plug blanks 102. Although the holder 111 illustrated in the drawings is designed for eight plug blank 102, the holder 111 could be designed to hold any number of plug blanks 102. The holder 111 for holding the plug blanks 102 has an arrangement 112 for holding eight separate plug blanks spaced apart from one another. The holder 111 for holding plug blanks 102 is movably mounted relative to the arrangement 104 for moving the plug blanks 102 so that each arrangement 112 for holding a plug blank 102 is independently alignable with the arrangement 104 for moving the plug blanks.

The holder 111 for holding plug blanks 102 is a cylinder 111 having eight through bores 113 each having a longitudinal axis parallel to the longitudinal axis of the cylinder 111. The holder 111 for holding plug blanks 102 is a cylinder 111 having through bores 113 spaced angularly around the circumference of the cylinder 111. The holder 111 for holding plug blanks 102 has cylinder 111 having the through bores 113 equi-spaced angularly around the circumference of the cylinder 111. The holder 111 for holding plug blanks 102 is a cylinder 111 having a gripping arrangement 114 on the outer curved surface of the cylinder 111. Advantageously, this allows an operator to easily rotate the cylinder 111 so as to align the through bores 113 with the arrangement 104 for moving the plug blanks 102.

The holder 111 for holding a plurality of blanks is the cylinder 111 having a plurality of indentations 114 on the outer curved surface 115 of the cylinder 111. The cylinder 111 for holding the plug blanks 102 is movably mounted relative to the arrangement 104 for moving the plug blanks 102 so that each through bore 113 of the cylinder 111 for holding a plug blank 102 is independently alignable with the arrangement 104 for moving the plug blank 102. The arrangement 104 for moving the plug blanks 102 has a hammer 115 having a leading end 116 for positively engaging a plug blank 102 and a trailing end 117 distal the leading end 116. The hammer 115 has a plug blank dispensing position and an out of use position illustrated in FIGS. 1 and 2 and a biasing arrangement 119 for normally biasing the hammer 115 into an out of use position. The hammer 115 has a drum 121 for engaging the actuation arrangement 107. An elongate slot is provided in the underside of the drum 121 for receiving the actuation finger of the trigger 128.

The plug insertion assembly 101 has a housing 122 for locating and supporting the arrangement 103 for guiding movement of the plug blank 102 and for locating and supporting the arrangement 104 for moving the plug blank 102. The housing 122 has a handle 123. The housing 122 has a bearing arrangement 124, see FIG. 3 for journaling the two ends of the hammer 115 and for allowing the hammer 115 to slide along the housing 122 towards and away from the arrangement 103 for guiding movement of the plug blanks 102. The housing 122 has an arrangement 125 being a fulcrum 125 for pivotally coupling the actuation arrangement 107/128 to the housing 122. The housing 122 has a plug blank insertion end 126, see FIG. 3 for locating and supporting the arrangement 103 for guiding movement of the plug blanks 102. The arrangement 103 for guiding movement of the plug blanks 102 is rotatably mounted on the plug blank insertion end 126 of the housing 122. The plug blank insertion assembly 101 has an indicia arrangement 127, see FIG. 2 for indicating which plug blank 102 is currently being inserted into the horse shoe stud orifice. The indicia arrangement 127 is a visual indicia arrangement 127. The indicia arrangement 127 is a visual marker. The indicia arrangement 127 has a visual alignment line to act as a line of sight for the operator to properly align the dispensing end of the plug blank insertion assembly 101 with the stud orifice of the horse shoe. The visual maker is located on the plug blank insertion end 126 of the plug blank insertion assembly 101.

Referring to the drawings and more particularly to FIGS. 4a and 4b, the plug blank 102 is an elongate rod most preferably a cylindrical rod. The plug blank 102 can be of various lengths and the plug blank material is malleable and compressible. Upon insertion of the compressible plug 102 into the empty stud orifice 2, the plug material expands into the gaps between the internal thread for securely fastening the plug blank 102 in position. The plug material comprising but not limited to rubber and/or plastic and/or polymer and/or any combination thereof. In one particularly preferred embodiment, the plug material is selected from but not limited to PVC or Polyethylene or Polypropylene or any combination thereof. The plug material of the embodiment shown is a thermo plastic elastomer (TPE) and more particularly a TPV.

The plug 102 is designed to have substantially the same shape and size as the vacant stud orifice 2. The plug 102 having an inference fit with the stud orifice 2. Advantageously, the inference fit created between the plug 102 and the orifice 2 prevents the accumulation of dirt and debris in the orifice 2. The plug blank 102 is a cylindrical rod with a saw tooth configuration outer surface 132. The plug blank 102 is a cylindrical rod with a radially corrugated outer surface 132. The plug blank 102 has a plurality of uniform teeth 134 protruding radially around the cylindrical rod. Each tooth 134 having a leading conical surface 135 tapering from a central large diameter rim 136 to a small diameter leading edge 138 and a trailing conical surface 137 tapering from the central large diameter rim 136 to a small diameter trailing edge 139. The tapered leading conical surface 135 improves the insertion of the plug 102 into the empty stud orifice 2 and across the internal thread. The tapered trailing conical surface 137 improves the retention of the plug 102 in the stud orifice 2 by interfering with the inner thread of the orifice 2.

The leading conical surface 135 tapers at an angle in a range of 40° to 75° to a plane perpendicular to the longitudinal axis of the plug blank 102. The leading conical surface 135 tapers at an angle in a range of 55° to 65° and most preferably at an angle of 58° to a plane perpendicular to the longitudinal axis of the plug blank 102. The trailing conical surface 137 tapers at an angle in a range of 20° to 50° to a plane perpendicular to the longitudinal axis of the plug blank 102. The trailing conical surface 137 tapers at an angle in a range of 30° to 40° and most preferably at an angle of 34° to a plane perpendicular to the longitudinal axis of the plug blank 102.

The plug blank 102 has an indicator 140 for indicating which end of the plug blank 102 is to be inserted into the guiding arrangement 103 first and/or into the horse shoe stud orifice 2 first. The indicator 140 is visual or tactile. The indicator 140 is a visual marker. The visual maker 140 is located on one end of the plug blank 102. The plug blank 102 is visually optimized for improving the visibility of the plug blank. Advantageously, this allows the plug blank to be seen in low light conditions and/or makes the presence or absence of the plug blank more easily identifiable under the normal working conditions of a horse. The plug blank 102 is manufactured from a white or cream material. Alternatively, the plug blank is manufactured from a material with a white or cream pigment added. The plug blank 102 has a length in the range of 9 mm to 11 mm and most preferably has a length of 10 mm. The plug blank 102 has an outside diameter in a range of 8 mm to 9 mm, preferably in a range of 8.5 mm to 8.7 mm and most preferably an outside diameter of 8.64 mm. The plug blank 102 material has a shore hardness value in the range of 60 to 80 and most preferably has a shore hardness of 69.

In use, an operator holds the plug blank insertion assembly 101 in their hand by the handle while lightly gripping the trigger 128 with their fingers. The trigger 128 has indentations for receiving the fingers of an operator's hand. The operator removes the cap from the plug blank guiding arrangement 103. The operator lifts a plug blank 102 and looks at the ends of the plug blank for the indicator 140. This allows the operator to identify which end of the plug blank 102 is to be inserted into the through bores 113 of the cylinder 111 first. The operator places eight plug blanks 102 in their correct orientation into the through bores 113 of the cylinder 111 and places the cap back over the cylinder 111 until they are located close to the animal wearing the horse shoes to be plugged. The operator removes the cap and lifts the horse's leg so that the hoof and the shoe is facing towards the operator. The operator moves the plug blank dispensing end 126 of the plug blank insertion assembly 101 towards an empty stud orifice of the horse shoe. The operator uses the visual maker 127 located on the plug blank insertion end 126 of the plug blank insertion assembly 101 to align the currently dispensable plug blank 102 with the empty horse shoe stud orifice. The operator holds the plug blank insertion end 126 of the plug blank insertion assembly 101 right up against the horse shoe aligned visually and squeezes the trigger 128 with their fingers towards the handle 123. The actuation finger of the trigger 128 engages a slot of the barrel 121 of the hammer and drives the hammer 115 forwards overcoming the biasing force of the spring 119 causing the leading end 116 of the hammer to push the currently aligned plug blank 102 through the through bore 113 of the cylinder 111.

The arrangement 104 for moving the plug blank being the hammer 115 is capable of extending into and through the arrangement 103 for guiding movement of the plug blank being the through bores 113 of the cylinder 11 for dispensing the plug blank 102 completely out of the arrangement 103 for guiding movement of the plug blank 102 so that the plug blank 102 is completely dispensed from the guiding arrangement 103 by the movement of the plug blank moving arrangement 104 only and into the horse shoe stud orifice. The plug blank is dimensioned so as to sit flush with the horse shoe to avoid being dragged out of the orifice during use. By positively engaging the railing end of the plug blank 102, the engaging force is sufficient to force the free end of the plug blank 102 into the empty stud orifice in the horse shoe without any slippage caused by minor misalignment of the plug blank and orifice or interference between the internal screw thread and the leading edge and/or outer surface of the plug blank 102.

When the plug blank 102 has been satisfactorily inserted, the trigger 128 is released and the biasing arrangement 19 pulls the hammer 115 back in to the out of use position. The cylinder 111 is rotated until the next plug blank is aligned with the moving arrangement 104 and the process is repeated until all of the stud orifices are filled with plug blanks.

Figure 5:
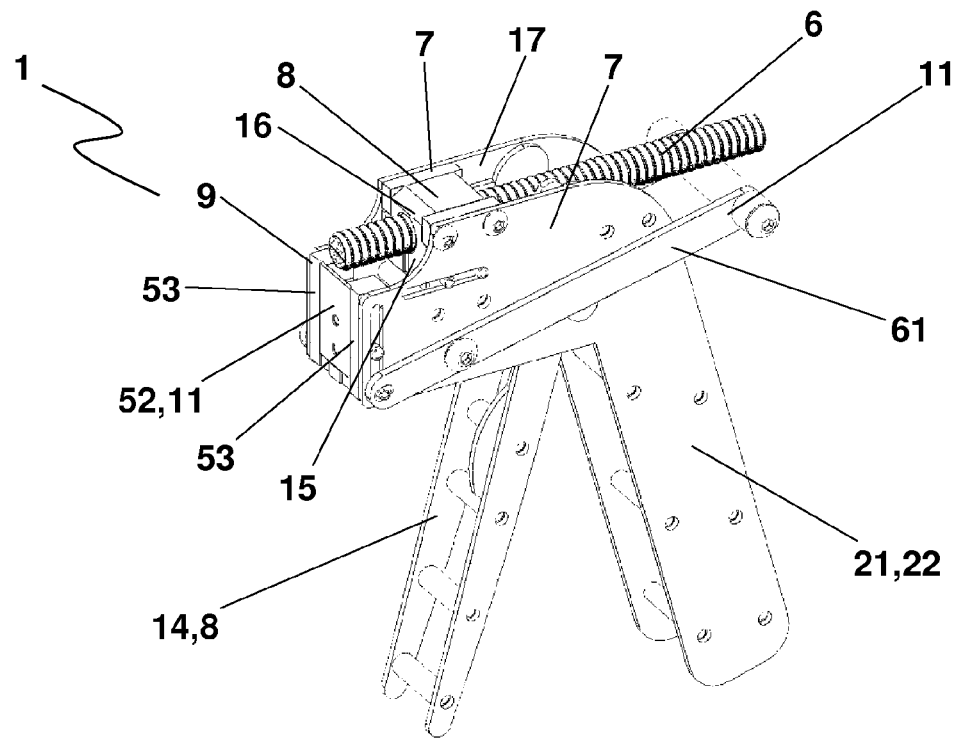
FIG. 5 is a perspective view of a second embodiment of plug insertion assembly.
Figure 6:
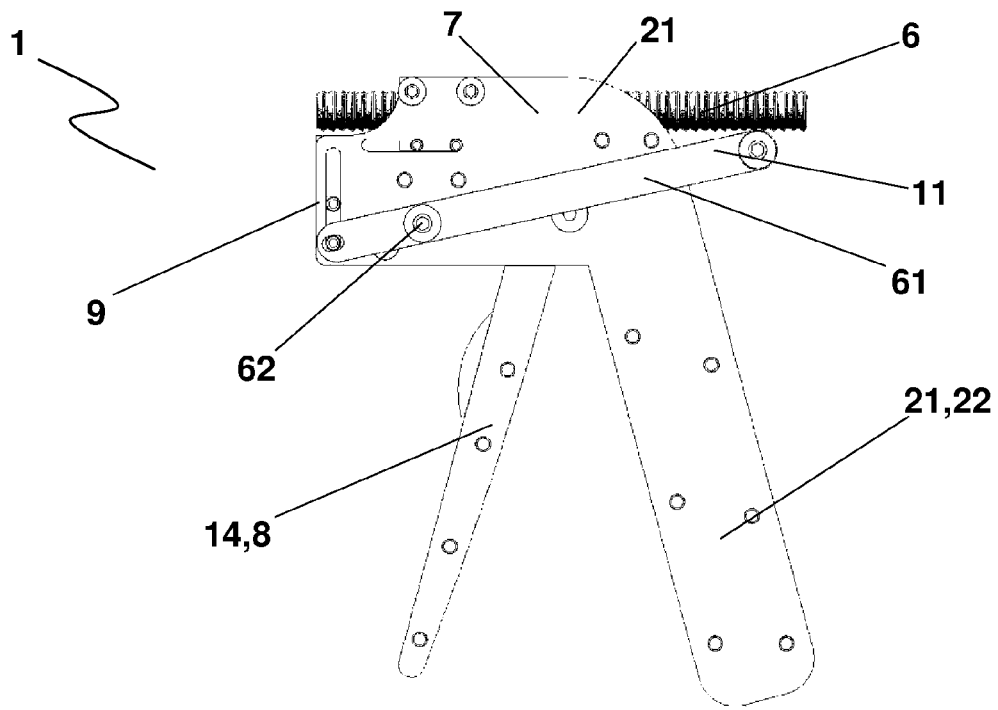
FIG. 6 is a side view of FIG. 5.
Figure 7:
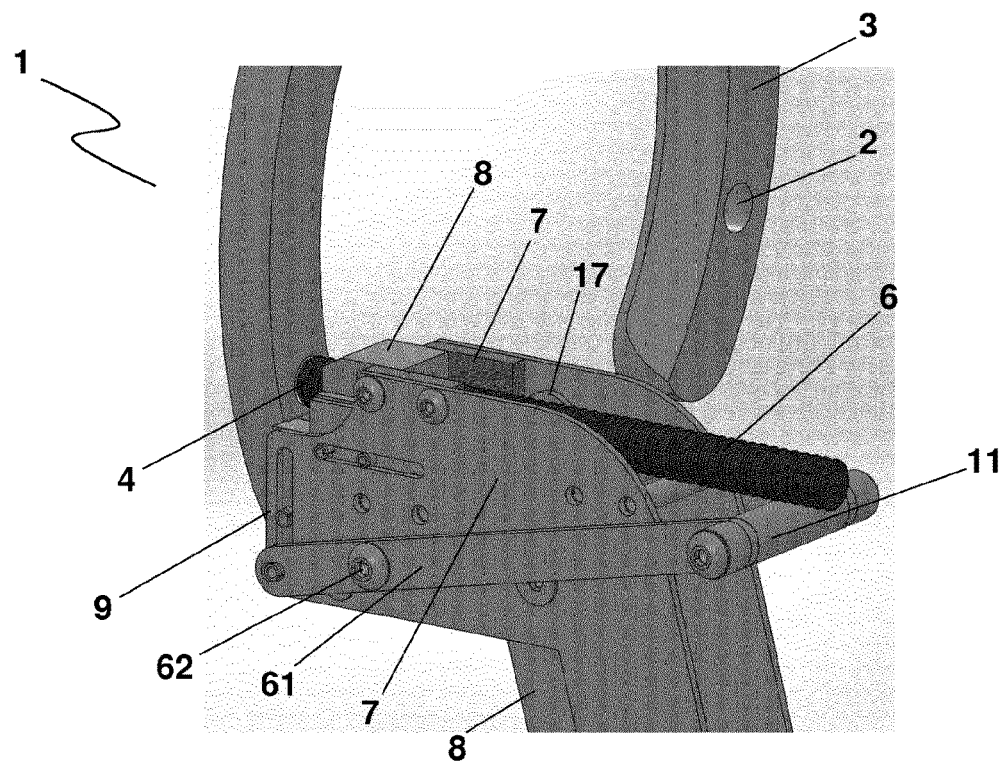
FIG. 7 is a perspective view of the second embodiment of plug insertion assembly in use.

In the drawings and generally referring to FIGS. 5 to 10, there is shown a plug insertion assembly indicated generally by the reference numeral 1 for inserting a plug 4 into a stud orifice 2 of a horseshoe 3, see FIG. 7. The plug insertion assembly 1 has an arrangement 7 for guiding movement of a plug blank 6 and an arrangement 8 for moving the plug blank 6 via the guiding arrangement 7 towards a plug blank dispensing end 9 of the plug insertion assembly 1 so the plug blank 6 protrudes a predetermined distance from the plug insertion assembly 1.

Advantageously, the arrangement 8 for moving the plug blank 6 urges the plug blank 6 along the guide arrangement 7 so as to protrude a distance equating to the length of a plug 4. In this way the exact amount of blank material protrudes from the plug insertion assembly 1 allowing the plug blank 6 to be cut in position or pre-cut during manufacturing.

The plug insertion assembly 1 has an arrangement 11 for cutting the protruding plug blank 6 into a plug 4. In an alternative arrangement the plug blank 6 is precut. The arrangement 8 for moving the plug blank 6 along the guiding arrangement 7 has an arrangement (not shown) for positively engaging the plug blank 6. By positively engaging the plug blank 6 we mean that the engaging force is sufficient to force the free end of the plug blank 6 into the empty stud orifice 2 in the horse shoe 3 without any slippage between the engaging arrangement and the plug blank 6 against at least some forces caused by minor misalignment of the plug blank 6 and orifice 2 or interference between the internal screw thread and the leading edge and/or outer surface of the plug 4. The arrangement for engaging at least part of the plug blank 6 is movable relative to the guiding arrangement 7. The plug insertion assembly 1 has an actuation member 14. The arrangement 8 for moving the plug blank 6 along the guiding arrangement 7 is the actuation member 14. The actuation member 14 is operably coupled to the plug blank engaging arrangement. The actuation member 14 is a trigger. The actuation member 14 is pivotally coupled to or proximal to the arrangement 7 for guiding the plug blank 6. In two embodiments illustrated in FIGS. 5 and 6, the arrangement for engaging the plug blank 6 is part of the actuation member 16. In these embodiments, the arrangement for engaging the plug blank 6 comprises a spike, or teeth or a clamp or an urging arrangement acting against the end of the plug blank.

In the embodiment illustrated in FIGS. 5 to 8, the engagement arrangement 15 has an adjustable clamping arrangement 15 for gripping and releasing the plug blank 6. The adjustable clamping arrangement 15 has an adjustment arrangement for adjusting the aperture of the adjustable clamping arrangement 15. The actuation member 14 is operably coupled to the adjustment arrangement. The adjustable clamping arrangement 15 has a collar or a body 15 having a through bore 16 for receiving the plug blank 6. In this embodiment, the size of the aperture of the collar or through bore 16 is adjustable. Advantageously, this allows the plug blank 6 to be gripped and released depending on the direction of motion of the actuation member 14. When the actuation member 14 is driving the plug blank 6 towards the dispensing end 9 of the plug insertion assembly 1, the collar or body 15 with through bore 16 is gripping the plug blank 16. When the actuation member 14 is moving the adjustable clamping arrangement away from the dispensing end 9 of the plug insertion assembly 1, the collar or body 15 with through bore 16 releases the plug blank 6. The plug blank 6 is movable through the collar or body 15 with through bore 16 when the actuation member 14 is released. The plug insertion assembly 1 has abutment arrangement for abutting the plug blank 6 when the actuation member 14 is released. Advantageously, this prevents the plug blank 6 from sliding backwards away from the dispensing end 9 when the actuation member 14 is released.

The guiding arrangement 7 for the plug blank 6 has a channel 17 for receiving the plug blank 6. The channel 17 is an elongate channel extending along a longitudinal axis of the plug insertion assembly 1. The arrangement 7 for guiding the plug blank 6 has movement control arrangement for preventing other than longitudinal movement of the plug blank 6 along the arrangement 7 for guiding the plug blank 7. The movement control arrangement in combination with the channel 17 directs the plug blank 6 towards and into the stud orifice 2 of the horse shoe 3. The plug blank movement control arrangement is disposed along at least part of the length of the channel 17. In the embodiment illustrated in FIGS. 5 to 8, the plug blank movement control arrangement is at least one body 15 with a through bore 16 for guiding the movement of the plug blank 6. In the embodiments illustrated in FIGS. 9 and 10, the guide arrangement 7 comprises a tubular body 18. In this embodiment, the plug blank movement control arrangement is the tubular body 18.

As best illustrated in FIGS. 9 and 10, the actuation member 14 is operably coupled to the cutting arrangement 11. The actuation member 14 is adapted to operate the cutting arrangement 11 only when the predetermined length of the plug blank 6 has been projected from the dispensing end 9 of the plug insertion assembly 1. The same actuation member 14 operates both the arrangement 8 for moving the plug blank 6 and the cutting arrangement 11.

In an alternate arrangement illustrated in FIGS. 5 to 7, separate actuation members 14, 11 are used for the arrangement 8 for moving the plug blank 6 and the cutting arrangement 11.

In embodiments two three and four, the cutting end of the cutting arrangement 11 is mounted on the plug blank dispensing end 9 of the plug insertion assembly 1. The cutting plane of the cutting arrangement 11 is orthogonal to the longitudinal axis of the plug blank 6. The plug insertion assembly 1 is a handheld device. The plug insertion assembly has a main body 21 comprising a handle 22, an actuation member 14 and a plug blank guiding arrangement 7. In a preferred embodiment, the actuation member having a handle 22 and a trigger/lever 14 being pivotally coupled to the handle 22 between an out of use position as illustrated in FIGS. 5, 6, 9*a*, 9*c*, 10*a*, 10*c* and an in use position as illustrated in FIGS. 7, 9*b*, 9*d*, 10*b* and 10*d*. The trigger/lever 14 being normally biased into an out of use position.

The main body 21 of the plug insertion assembly 1 is manufactured from but not limited to metal and/or plastic and/or composite materials or any combination thereof.

In the embodiment illustrated in FIGS. 9 and 10, the cutting arrangement 11 has an elongate lever 41 pivotally mounted proximal to a cutting end to a support member 43 on the guide arrangement 7 and pivotally coupled at the other end to an actuating lever 42. In this embodiment, when the actuating lever 14 is in the out of use position FIGS. 9*a* and 9*c*, the blade 45 of the guillotine 11 rests across the dispensing end 9 of the guide arrangement 7 under the influence of the biasing arrangement normally biasing the actuation member 14 into this position. When a user places the dispensing end of the guiding arrangement 7 against an orifice 2 of a horseshoe as illustrated in FIG. 7 and squeezes the trigger 14 towards the handle 21, the lever 42 is acted on by the trigger 14 which causes the elongate lever 41 to pivot about support member 43. The blade 45 is moved away from the dispensing end 9 of the guide arrangement 7. Simultaneously, the end of the trigger 14 proximal to the plug blank 6 positively engages the plug blank 6 and drives it forward along the channel 17 the predetermined distance approximately equal to the length of a plug 4. This length of plug blank 6 protrudes from the end of the guide arrangement 7 and is guided into the orifice 2 by a user. As the operator releases the trigger 14, the blade 45 moves from its position in FIGS. 9*b* and 9*d* to its position in FIGS. 9*a* and 9*c* and slices off the protruding plug blank 6 to create a plug 4 cut flush with the planar surface of the horseshoe 3 having the orifice 2.

In the embodiment illustrated in FIGS. 9 and 10, the cutting arrangement 11 also has an elongate lever 41 having a cranked end 51 pivotally mounted proximal to a cutting end to a support member 43 on the guide arrangement 7 and pivotally coupled at the other end to an actuating lever 42. In this embodiment, when the actuating lever 14 is in the in use position FIGS. 10b and 10d, the blade 45 of the guillotine 11 rests across the dispensing end 9 of the guide arrangement 7 under the influence of the operators grip squeezing the trigger 14 biasing the actuation member 14 into this position. When a user places the dispensing end of the guiding arrangement 7 against an orifice 2 of a horseshoe as illustrated in FIG. 3 and squeezes the trigger 14 towards the handle 21, the end of the trigger 14 proximal to the plug blank 6 positively engages the plug blank 6 and drives it forward along the channel 17 the predetermined distance approximately equal to the length of a plug 4. This length of plug blank 6 protrudes from the end of the guide arrangement 7 and is guided into the orifice 2 by a user. At or about the end of the travel of the trigger 14, the lever 42 is acted on by the trigger 14 which causes the elongate lever 41 to pivot about support member 43. The blade 45 is moved across the dispensing end 9 of the guide arrangement 7. As the operator squeezes the trigger 14 home, the blade 45 moves into position illustrated in FIGS. 6b and 6d and slices off the protruding plug blank 6 to create a plug 4 cut flush with the planar surface of the horseshoe 3 having the orifice 2.

In the embodiment illustrated in FIGS. 5 to 8, a square blade 52 of the cutting arrangement 11 is slidably mounted in a pair of mutually opposing channel portions 53 on the dispensing end 9 of the assembly 1.

Figure 8:
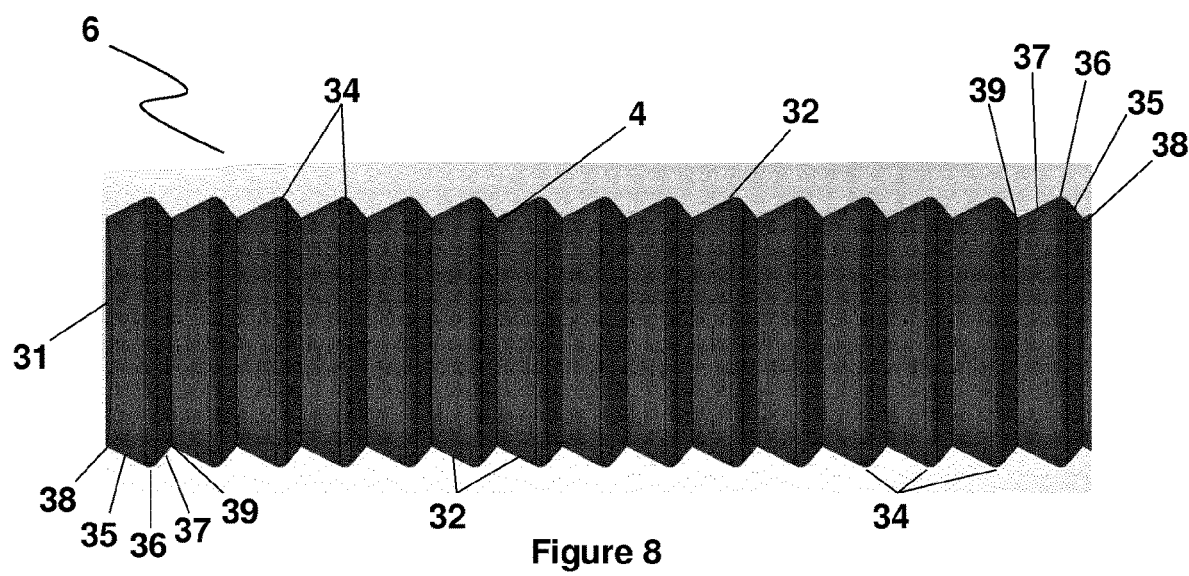
FIG. 8 is a side elevation view of a plug blank.
Figure 9A:
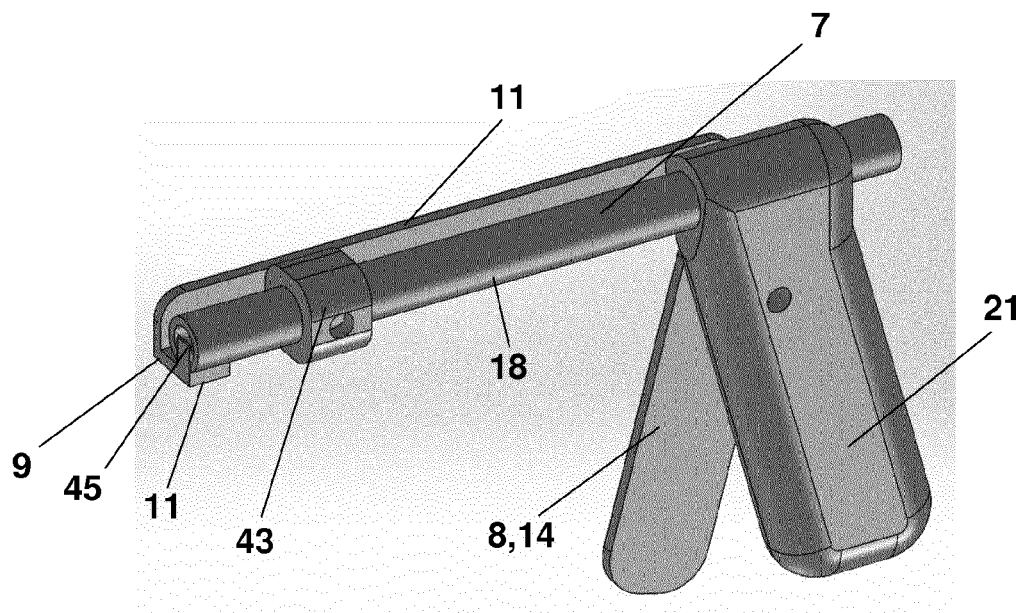
FIG. 9a is a schematic perspective view of a third embodiment of plug insertion assembly in a first out of use configuration.
Figure 9B:
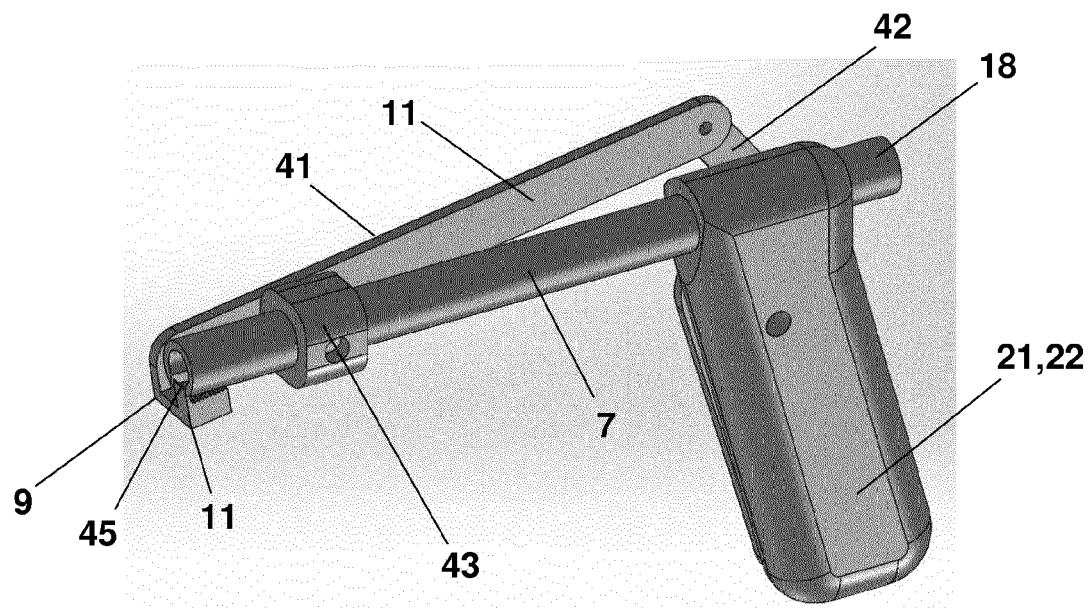
FIG. 9b is a schematic perspective view of a third embodiment of plug insertion assembly in an in use configuration.
Figure 9C:
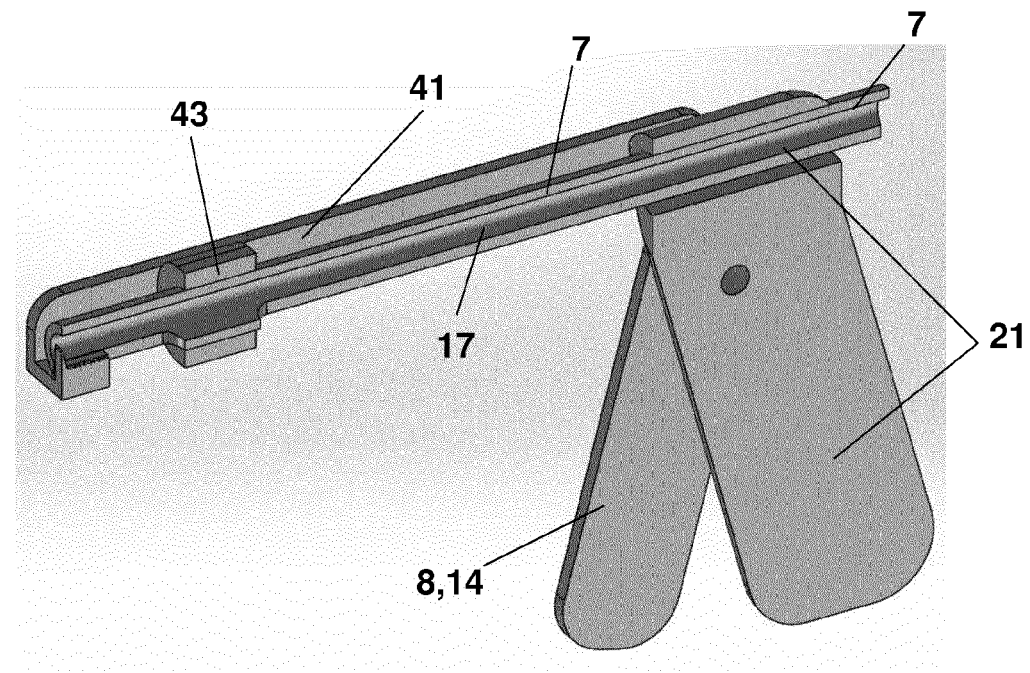
FIG. 9c is a schematic vertical section perspective view of the third embodiment of plug insertion assembly in a first out of use configuration.
Figure 9D:
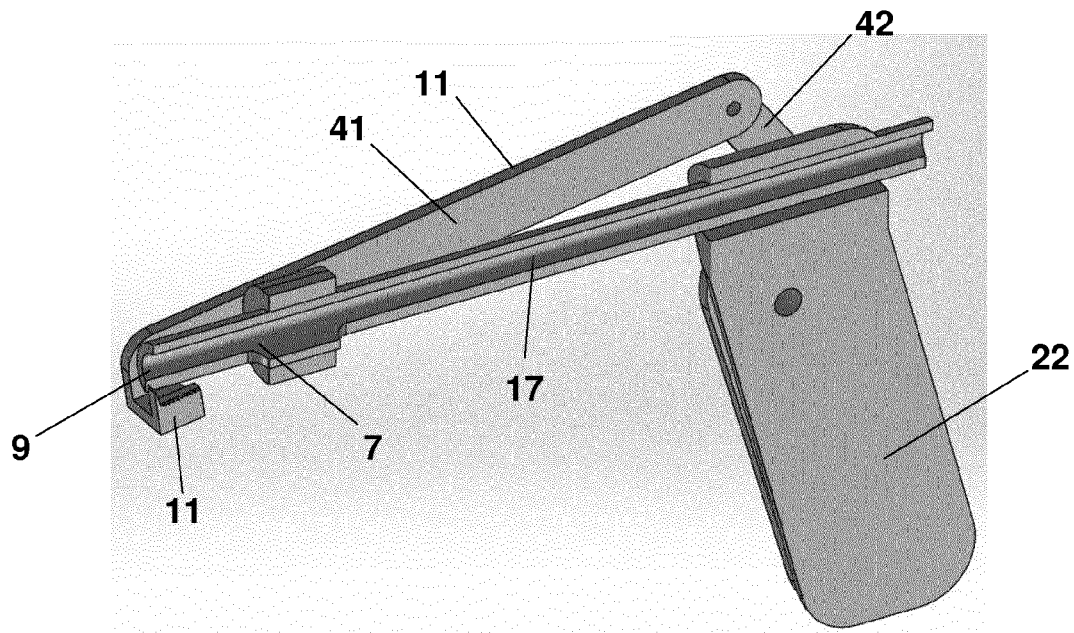
FIG. 9d is a schematic vertical section perspective view of the third embodiment of plug insertion assembly in an in use configuration.
Figure 10A:
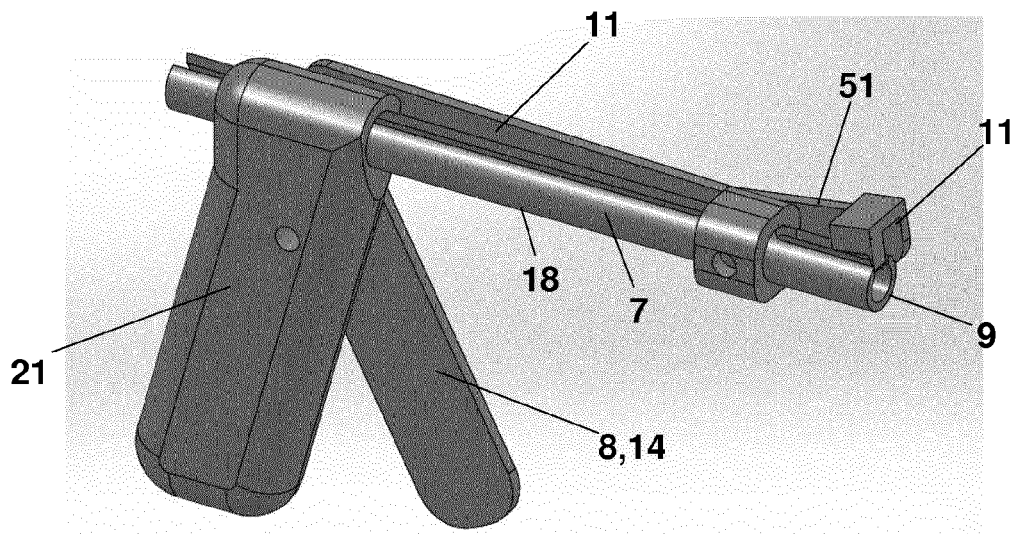
FIG. 10a is a schematic perspective view of a fourth embodiment of plug insertion assembly in a first out of use configuration.
Figure 10B:
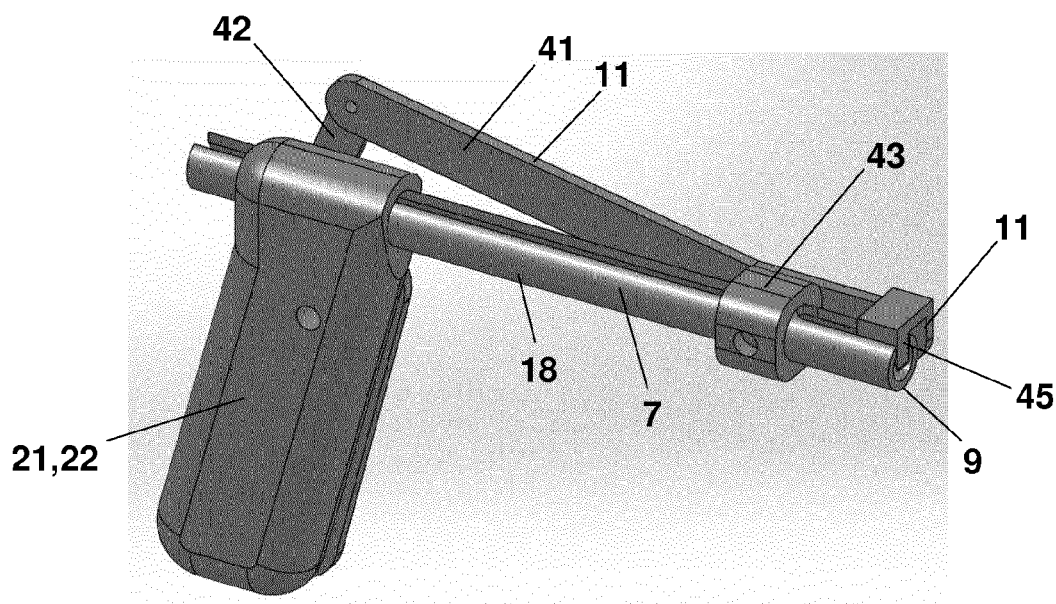
FIG. 10b is a schematic perspective view of a fourth embodiment of plug insertion assembly in an in use configuration.
Figure 10C:
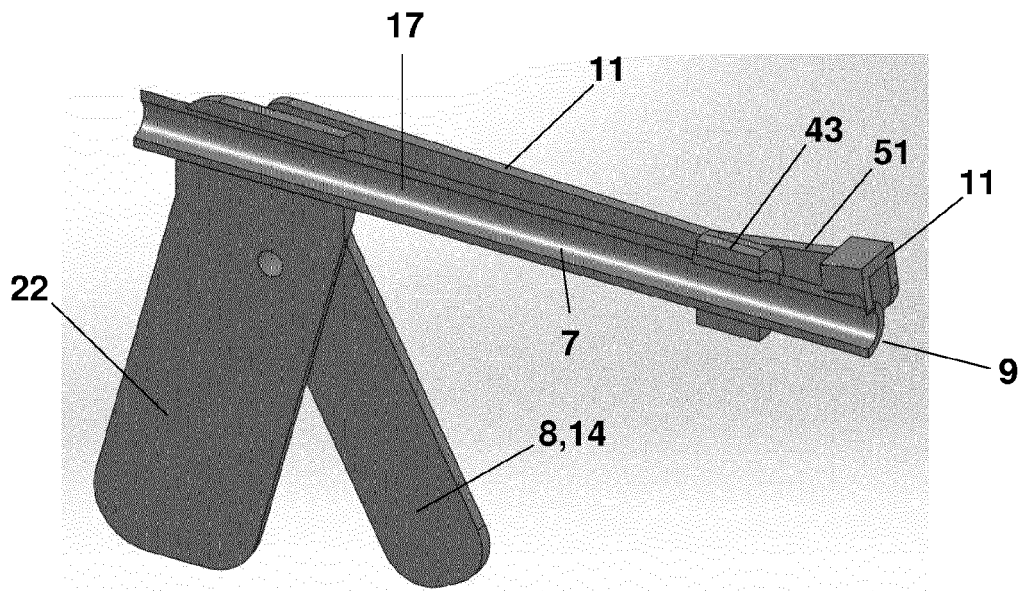
FIG. 10c is a schematic vertical section perspective view of the fourth embodiment of plug insertion assembly in a first out of use configuration.
Figure 10D:
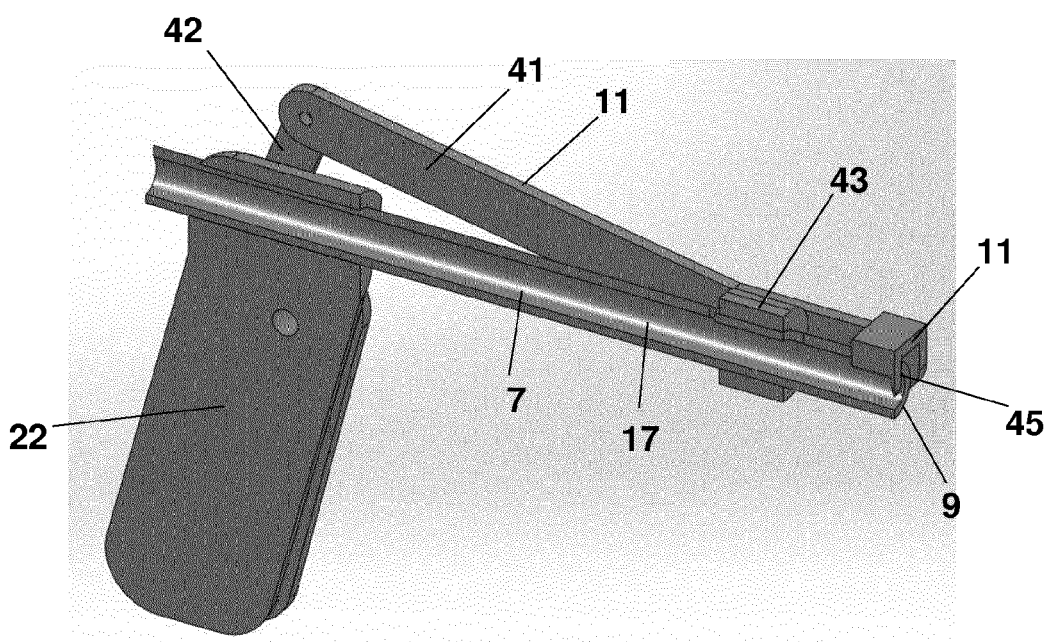
FIG. 10d is a schematic vertical section perspective view of the fourth embodiment of plug insertion assembly in an in use configuration.

In the embodiment illustrated in FIGS. 5 to 8, the cutting arrangement 11 also has an elongate lever 61 having a first end pivotally mounted proximal to the blade 52 and pivotally coupled between its ends to the main body. When a user places the dispensing end of the guiding arrangement 7 against an orifice 2 of a horseshoe as illustrated in FIG. 8 and squeezes the trigger 14 towards the handle 21, the end of the trigger 14 proximal to the plug blank 6 positively engages the movement arrangement 8 and drives it forward along the channel 17 the predetermined distance approximately equal to the length of a plug 4. The distance is determined by the depth of the orifice 2. This length of plug blank 6 protrudes from the end of the guide arrangement 7 and is guided into the orifice 2 by a user, again see FIG. 7. At or about the end of the travel of the trigger 14, the lever 61 is either acted on by the trigger 14 or manually actuated by a user which causes the elongate lever 61 to pivot about fulcrum 62. The blade 52 is moved across the projecting portion of the plug blank 6 slicing off a plug 4 cut flush with the planar surface of the horseshoe 3 having the orifice 2.

Although the cutting arrangement 11 is shown as a blade 45, 53, it will of course be appreciated that a wire or any cutting device could be used.

Referring to the drawings and more particularly to FIG. 8, the plug blank 6 is an elongate rod 6 most preferably a cylindrical rod 6. The plug blank 6 can be of various lengths and the plug blank material is malleable and compressible. Upon insertion of the compressible plug 4 into the empty stud orifice 2, the plug material expands into the gaps between the internal thread for securely fastening the plug 4 in position. The plug material comprising but not limited to rubber and/or plastic and/or polymer and/or any combination thereof. In one particularly preferred embodiment, the plug material is selected from but not limited to PVC or Polyethylene or Polypropylene or any combination thereof. The plug material of the embodiment shown is a thermo plastic elastomer (TPE).

The plug 4 is designed to have substantially the same shape and size as the vacant stud orifice 2. The plug 4 having an inference fit with the stud orifice 2. Advantageously, the inference fit created between the plug 4 and the orifice 2 prevents the accumulation of dirt and debris in the orifice 2. The plug blank 6 is a cylindrical rod 31 with a saw tooth configuration outer surface 32. The plug blank 6 is a cylindrical rod 31 with a radially corrugated outer surface 32. The plug blank 6 is a cylindrical rod 31 with a plurality of uniform teeth 34 protruding radially around the cylindrical rod 31. Each tooth 34 having a leading conical surface 35 tapering from a central large diameter rim 36 to a small diameter leading edge 38 and a trailing conical surface 37 tapering from the central large diameter rim 36 to a small diameter trailing edge 39. The tapered leading conical surface 35 improves the insertion of the plug 4 into the empty stud orifice 2 and across the internal thread. The tapered trailing conical surface 37 improves the retention of the plug 4 in the stud orifice 2 by interfering with the inner thread of the orifice 2.

In relation to the detailed description of the different embodiments of the invention, it will be understood that one or more technical features of one embodiment can be used in combination with one or more technical features of any other embodiment where the transferred use of the one or more technical features would be immediately apparent to a person of ordinary skill in the art to carry out a similar function in a similar way on the other embodiment.

In the preceding discussion of the invention, unless stated to the contrary, the disclosure of alternative values for the upper or lower limit of the permitted range of a parameter, coupled with an indication that one of the said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The features disclosed in the foregoing description or the following drawings, expressed in their specific forms or in terms of a means for performing a disclosed function, or a method or a process of attaining the disclosed result, as appropriate, may separately, or in any combination of such features be utilised for realising the invention in diverse forms thereof as defined in the appended claims.

The invention claimed is:
1. A horseshoe plug blank insertion assembly for inserting a horseshoe plug blank into a stud orifice of a horseshoe, comprising:
   means for guiding movement of the horseshoe plug blank;
   means for moving the horseshoe plug blank via the guiding means towards and out of a horseshoe plug blank dispensing end of the horseshoe plug blank insertion assembly so the horseshoe plug blank is dispensed from the horseshoe plug blank insertion assembly into the stud orifice of the horseshoe;
   wherein the means for moving the horseshoe plug blank includes a hammer having a leading end for positively engaging the horseshoe plug blank;
   wherein the hammer has a horseshoe plug blank dispensing position and an out of use position; and a biasing means for normally biasing the hammer into an out of use position;

wherein the guiding means includes a holder for holding a plurality of horseshoe plug blanks, the holder being a cylinder having a plurality of through bores spaced angularly around a circumference of the cylinder;

wherein movement of the means for moving the horseshoe plug blank completely dispenses the horseshoe plug blank from the cylinder directly into the stud orifice of the horseshoe;

wherein the horseshoe plug blank is comprised of a material selected from the group consisting of rubber, plastic, polymer and combinations thereof;

wherein the horseshoe plug blank comprises a cylindrical rod with a plurality of uniform teeth protruding radially around the cylindrical rod, each tooth having a leading conical surface tapering from a central large diameter rim to a small diameter leading edge and a trailing conical surface tapering from the central large diameter rim to a small diameter trailing edge.

2. The plug blank insertion assembly as claimed in claim 1, wherein the means for moving the plug blank along the guiding means comprises means for positively engaging at least part of the plug blank.

3. The plug blank insertion assembly as claimed in claim 2, wherein the means for positively engaging at least part of the plug blank is movable relative to the guiding means.

4. The plug blank insertion assembly as claimed in claim 1, wherein the plug blank insertion assembly includes actuation means.

5. The plug blank insertion assembly as claimed in claim 1, wherein the means for moving the plug blank along the guiding means comprises actuation means.

6. The plug blank insertion assembly as claimed in claim 1, further comprising actuation means, wherein the actuation means is operably coupled to the plug blank engaging means.

7. The plug blank insertion assembly as claimed in claim 1, further comprising actuation means, wherein the actuation means comprises the trigger.

8. The plug blank insertion assembly as claimed in claim 1, further comprising actuation means, wherein the actuation means is movably and pivotally coupled to or proximal to the means for guiding the plug blank.

9. The plug blank insertion assembly as claimed in claim 1, wherein the means for guiding movement of the plug blank comprises a holder for holding a plurality of plug blanks.

10. The plug blank insertion assembly as claimed in claim 9, wherein the holder for holding the plurality of plug blanks comprises means for holding the plurality of separate plug blanks spaced apart from one another.

11. The plug blank insertion assembly as claimed in claim 10, wherein the holder for holding the plurality of plug blanks is movably mounted relative to the means for moving the plug blank so that each means for holding the plug blank is independently alignable with the means for moving the plug blank.

12. The plug blank insertion assembly as claimed in claim 9, wherein the holder for holding the plurality of plug blanks comprises a cylinder having a plurality of through bores each having a longitudinal axis parallel to the longitudinal axis of the cylinder.

13. The plug blank insertion assembly as claimed in claim 12, wherein the holder for holding the plurality of blanks comprises the cylinder having a plurality of through bores spaced angularly around the circumference of the cylinder.

14. The plug blank insertion assembly as claimed in claim 13, wherein the holder for holding the plurality of blanks comprises the cylinder having a plurality of through bores equi-spaced angularly around the circumference of the cylinder.

15. The plug blank insertion assembly as claimed in claim 14, wherein the cylinder for holding the plurality of plug blanks is movably mounted relative to the means for moving the plug blank so that each through bore of the cylinder for holding the plug blank is independently alignable with the means for moving the plug blank.

16. The plug blank insertion assembly as claimed in claim 12, wherein the holder for holding the plurality of blanks comprises the cylinder having a gripping means on the outer curved surface of the cylinder.

17. The plug blank insertion assembly as claimed in claim 1, wherein the hammer has a means for engaging the actuation means.

18. The plug blank insertion assembly as claimed in claim 1, further comprising a housing for locating and supporting the means for guiding movement of the plug blank and for locating and supporting the means for moving the plug blank.

19. The plug blank insertion assembly as claimed in claim 18, wherein the housing comprises a handle.

20. The plug blank insertion assembly as claimed in claim 18, wherein the housing has bearing means for journaling the two ends of the hammer and for allowing the hammer to slide along the housing towards and away from the means for guiding movement of the plug blank.

21. The plug blank insertion assembly as claimed in claim 20, wherein the means for guiding movement of the plug blank is rotatably mounted on the plug blank insertion end of the housing.

22. The plug blank insertion assembly as claimed in claim 18, wherein the housing comprises means for movably and pivotally coupling the actuation means to the housing.

23. The plug blank insertion assembly as claimed in claim 18, wherein the housing has a plug blank insertion end for locating and supporting the means for guiding movement of the plug blank.

24. The plug blank insertion assembly as claimed in claim 1, wherein the plug blank insertion assembly has a plug blank comprising an elongate rod or a cylindrical rod.

25. The plug blank insertion assembly as claimed in claim 1, the biasing means further comprising a spring, wherein a longitudinal axis of the spring and the hammer are in alignment.

26. The plug blank insertion assembly as claimed in claim 1, the biasing means further comprising a spring, wherein the hammer moves through the spring.

* * * * *